United States Patent
Cicchino

(10) Patent No.: US 9,015,221 B2
(45) Date of Patent: Apr. 21, 2015

(54) METHOD AND APPARATUS FOR DISTRIBUTING OBJECTS

(75) Inventor: Domenic A. Cicchino, Freehold, NJ (US)

(73) Assignee: Vonage Network LLC, Holmdel, NJ (US)

(*) Notice: Subject to any disclaimer, the term of this patent is extended or adjusted under 35 U.S.C. 154(b) by 530 days.

(21) Appl. No.: 13/309,053

(22) Filed: Dec. 1, 2011

(65) Prior Publication Data

US 2013/0144924 A1     Jun. 6, 2013

(51) Int. Cl.
*G06F 7/00*     (2006.01)
*G06F 7/38*     (2006.01)

(52) U.S. Cl.
CPC .......................... *G06F 7/38* (2013.01)

(58) Field of Classification Search
None
See application file for complete search history.

(56) References Cited

U.S. PATENT DOCUMENTS

| 2004/0017403 A1* | 1/2004 | Andersson et al. ........... 345/848 |
| 2010/0036901 A1* | 2/2010 | Rarick ......................... 708/532 |

\* cited by examiner

*Primary Examiner* — Michael D Yaary
(74) *Attorney, Agent, or Firm* — Moser Taboada; Joseph Pagnotta

(57) ABSTRACT

A method and apparatus for distributing objects. In one embodiment, the method comprises computing a modulus operand based on a number of objects to be distributed and a number of objects pertaining to a first category; computing a modulus operation based on a number of distributed objects and the modulus operand; and distributing a first object or a second object based on a result of computing the modulus operation.

17 Claims, 3 Drawing Sheets

US 9,015,221 B2

METHOD AND APPARATUS FOR DISTRIBUTING OBJECTS

BACKGROUND OF THE INVENTION

1. Field of the Invention

Embodiments of the present disclosure generally relate to distributing data and/or physical objects and, more particularly, to a method and apparatus for distributing data and/or physical objects based on distribution ratios for the objects.

2. Description of the Related Art

Distributing data objects in a data stream between computers and/or to different end locations is a common operation in data systems employed in a wide variety of applications. For example, different categories of data objects, such as data files of different types, may need to be sent from a client to a server based on particular distribution ratios for the different data object categories. As another example, data objects may need to be distributed to different data channels based on certain distribution ratios among the data channels.

In addition to data objects, a wide variety of physical objects require distribution based on the kind of object and/or to a particular location. For example, different manufactured articles may need to be distributed via conveyer belt to different "bins" following assembly.

For both data objects and physical objects, determining which object to send at a particular time and/or where to send a certain object may require manual preparation of lists based on distribution ratios. Such manual provisioning is often tedious and time consuming, in particular where the distribution ratios may fluctuate over time, and subject to human error.

Therefore, there is a need in the art for a method and apparatus for efficiently distributing objects.

SUMMARY OF THE INVENTION

Embodiments of the present invention generally relate to a method and apparatus for distributing objects. In one embodiment, the method comprises computing a modulus operand based on a number of objects to be distributed and a number of objects pertaining to a first category; computing a modulus operation based on a number of distributed objects and the modulus operand; and distributing a first object or a second object based on a result of computing the modulus operation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The subject invention provides for a method and apparatus for automatically distributing objects and advantageously does not rely on manually configured lists specifying distribution details. In accordance with one or more embodiments of the present invention, objects are automatically distributed based on a predefined mix of objects pertaining to different object categories. The objects may be data objects or physical objects and include, but are not limited to, file objects to be sent from a client to a server, phone calls to be routed to various destinations, or physical articles to be distributed to different locations. Examples of object categories include categories based on object type (e.g., data file formats, data file sizes, data file content, kinds of physical articles, size of physical articles, weight of physical articles, and the like) and categories based on distribution channels (e.g., different physical and/or logical channels for routing a data object, different locations to send a physical article, and the like.)

The method of the present invention utilizes an algorithm based on an estimated total or maximum number of objects to be distributed per distribution batch or period of time, as well as the percentage of the total number of objects each different object category represents. A modulus operand is computed for each of the different object categories other than the dominant object category (i.e., other than the object category having the highest percentage of objects within the total number of objects to be distributed). The resulting modulus operand values are utilized in modulus operations based on each of the different non-dominant object categories to determine the distribution for each object in the total number of objects.

Figure 1:
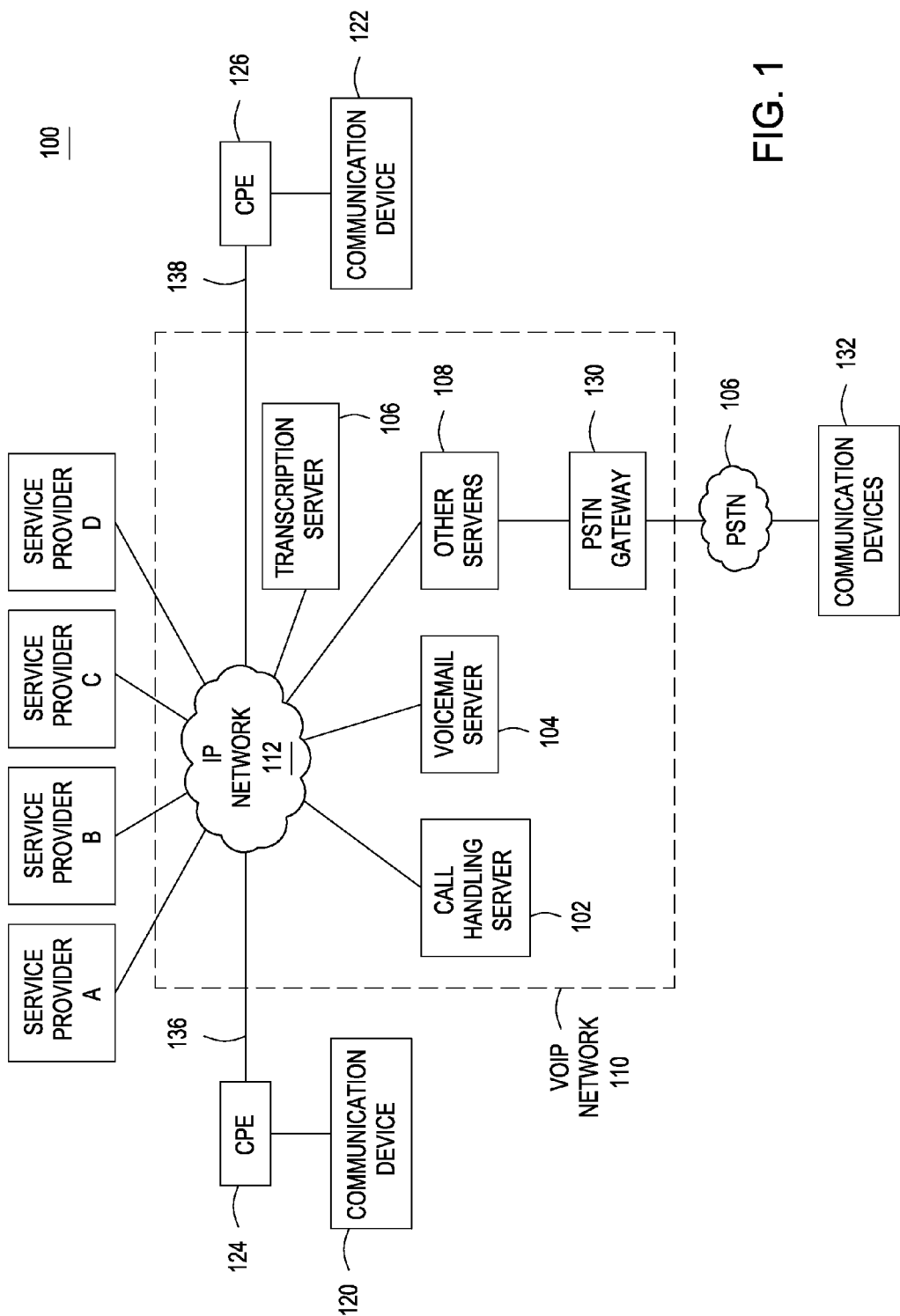
FIG. 1 is a block diagram depicting an exemplary embodiment of a communication system in accordance with one or more aspects of the present invention.

FIG. 1 is a block diagram depicting an exemplary embodiment of a communication system 100 in accordance with one or more aspects of the present invention. The communication system 100 includes a voice-over-internet-protocol (VOIP) network 110 (generally referred to as a telecommunication system) and a public switched telephone network (PSTN) 106, as well as service providers A, B, C, and D. The VOIP network 110 includes a call handling server 102, a voicemail server 104, a transcription server 106, and a plurality of other servers 108 coupled to an internet protocol (IP) network 112. The call handling server 102 is configured to handle calls to and from users of the VOIP network 110; for example, the call handling server 102 receives and directs communication requests. The voicemail server 104 provides voicemail capability for one or more VOIP service users (including, in some embodiments, visual voicemail), and the transcription server 106 provides a voice-to-text transcription of voicemails for one or more VOIP service users. The resulting transcription of a voicemail may then be communicated to the appropriate user, for example as an email message, a text message, or the like. In some other embodiments, the voicemail server 104 and/or the transcription server 106 may contained in a different network other than the VOIP network 110 (e.g., another VOIP network not shown or the PSTN network 106).

The servers 108 may include various well known servers configured to facilitate VOIP services, such as provisioning servers, proxy servers, media relay servers, and the like. The servers 102, 104, 106 and 108 may be implemented using a plurality of computer systems and like type general and/or specific purpose devices and systems. One or more of the servers 108 may be coupled to a PSTN gateway 130, which in turn is coupled to the PSTN 106. The PSTN 106 provides conventional telephone service to a plurality of communication devices 132 (e.g., conventional telephones, videophones, mobile phones, and the like), and the PSTN gateway 130 processes and facilitates communication between users having a connection to the PSTN and VOIP service users.

The service providers A, B, C, and D are each coupled to the IP network 112 and provide any of various telecommunication services, such as local telephone service, long distance telephone service, and the like, for communicating calls to/from the VOIP network 110.

Various customer premises equipment (CPE) 124 and 126 are coupled to the IP network 112 via links 136 and 138, respectively. The links 136 and 138 may include cable, digital subscriber line (DSL), or like type communication links known in the art. Various communication devices 120 and 122 may be coupled to the CPEs 124 and 126, respectively. The CPEs 124 and 126 may include modems, terminal adapters, routers, and the like configured to provide an interface between the communication devices 120 and 122, respectively, and the IP network 112. The communication devices 120 and 122 may comprise telephones, video phones, computers, mobile devices, and the like. The CPEs 124/126 and the communication devices 120/122 may be distributed among a plurality of subscribers to VOIP services provided by the VOIP network 110. In general operation, the subscribers use the communication devices 120/122 and the CPEs 124/126 to convert content (e.g., voice, video, data, some or all of which may be analog) and signaling into VOIP-based content and signaling ("a VOIP call"). Those skilled in the art will appreciate that the VOIP calls may pass through other IP networks before reaching the IP network 112 of the VOIP network 110. For example, the VOIP calls may pass through various IP networks of the Internet before being routed to the IP network 112 (e.g., internet service provider (ISP) networks, backbone networks, etc.). VOIP calls may be processed by the call handling server 102 as well as other servers within the VOIP network 110, such as servers 108, and may be directed to other subscribers of the VOIP network 110, to subscribers of other VOIP networks (not shown), or to subscribers of traditional telephone services (e.g., the PSTN 106).

In the description, references made to "communication devices" are used to refer to any type of device which is capable of interacting with an IP telephony system to complete a telephone call and/or perform the functions described with respect to the present invention. A communication device could be an IP telephone, a computer running IP telephony software, a telephone adapter which is itself connected to a normal analog telephone, or some other type of device capable of communicating via data packets. A communication device could also be a cellular telephone or a portable computing device that runs a software client (or "app") that enables the device to act as an IP telephone. Thus, a single device might be capable of operating as both a cellular telephone and an IP telephone. In certain of these circumstances the communication device and CPE are integrated as a single operable unit and interface with the IP Network 112 via one or more secondary networks such as a cellular network operating according to PSTN protocols.

In accordance with one or more embodiments of the present invention, a distribution batch of multilingual voice files are automatically distributed, based on a predefined language mix ratio, from the voicemail server 104 to the transcription server 106 for transcription to text. In some embodiments, such as the embodiment described here, a distribution batch of 5000 multilingual voice files comprises a language mix of 75% English-language voice files, 20% Spanish-language voice files, and 5% Italian-language voice files; in other embodiments, the number of voice files in a distribution batch may differ and/or the multilingual voice files may comprise a different language mix including additional or alternative languages and/or "noise" files (i.e., files that are audibly indistinguishable and cannot be transcribed). For each language other than the dominant language in the voice files (i.e., each language other than English for the embodiment described herein), a modulus operand is computed by determining the number of files of a particular language type in the batch and dividing the total number of files in the batch by the number of files of the particular language type. The modulus operand is computed as follows:

Total # Spanish-language voice files in batch=(Total # multilingual voice files in batch)*(% Spanish-language files in batch)=5000)*(20%)=1000 Spanish-language voice files to be sent    (1)

Spanish-language voice file modulus operand=(Total # multilingual voice files in batch)/(Total # Spanish-language voice files in batch)=5000/1000=5    (2)

Total # Italian-language voice files per batch=(Total # multilingual voice files in batch)*(% Italian-language files in batch)=(5000)*(5%)=250 Italian-language voice files to be sent    (3)

Italian-language voice file modulus operand=(Total # multilingual voice files in batch)/(Total # Italian-language voice files in batch)=5000/250=20    (4)

Upon computing the modulus operand for the Spanish- and Italian-language voice files, a looping distribution algorithm is invoked to determine when to send a file for each of the different languages. If neither a Spanish-language nor an Italian-language file is to be sent as determined during a particular loop of the distribution algorithm, an English-language file is sent by default; as such, an English-language voice file modulus operand does not need to be computed. The distribution algorithm determines which language file to distribute as follows, where spanMod equals the computed Spanish-language voice file modulus operand, itMod equals the computed Italian-language voice file modulus operand, and totObj equals the total number of multilingual voice files in the distribution batch:

Step 1: objSent=number of files from batch sent=1;
Step 2: Loop until stop signal is received;
Step 3: For each xMod, perform modulus operation:
(a)  modResSpan=Spanish modulus operation result=objSent % spanMod
(b) modReslt=Italian modulus operation result=objSent % itMod
Step 4: If modResSpan=0,
send a Spanish-language voice file and set objSent=objSent+1;
Step 5: If modReslt=0,
send an Italian-language voice file and set objSent=objSent+1;
Step 6: If none of the modulus operations results in a value of zero,
send an English-language voice file and set objSent=objSent+1;
Step 7: If objSent>totObj, set objSent=1;
Step 8: Repeat the loop.

As determined by the distribution algorithm, the different language voice files are distributed from the voicemail server 104 to the transcription server 106 based on the predefined mix of the percentage of files of each language. When a voice file for a particular language is to be sent, the voice file is selected from a voice file pool for that language.

In accordance with one or more other embodiments of the present invention, phone calls from the VOIP network 110 are automatically routed to the service providers A, B, C, and D based on predetermined call volumes for each of the service providers A, B, C, and D. For example, call volumes to be handled by each of the service providers A, B, C, and D may be negotiated and appropriate numbers of calls are then automatically routed from the VOIP network 110 to each of the service providers A, B, C, and D. In some embodiments, such as the embodiment described herein, call volumes may be predefined with each of the service providers A, B, C, and D such that a daily call volume of 1 million calls has 65% of its calls routed to service provider A, 20% of its calls routed to service provider B, 10% of its calls routed to service provider C, and 5% of its calls routed to service provider D. In other embodiments, one or more of the daily call volume and the percentages of calls to be routed to each service provider may differ; additionally or alternatively, calls may be routed to fewer or more service providers.

For each service provider other than the service provider receiving the dominant number of calls, a modulus operand is computed by determining the number of calls to be routed to a particular service provider and dividing the daily volume of calls by the number of calls to be routed to the particular service provider. The modulus operand for the calls to be handled by service providers B, C, and D, is computed as follows:

$$\text{Total \# calls in daily volume to be routed to service provider } B = (\text{Total \# calls in daily volume})*(\% \text{ calls to be routed to } B) = (1{,}000{,}000)*(20\%) = 200{,}000 \text{ calls to be routed to } B \quad (5)$$

$$\text{Service provider } B \text{ modulus operand} = (\text{Total \# calls in daily volume})/(\text{Total \# calls in daily volume to be routed to } B) = 1{,}000{,}000/200{,}000 = 5 \quad (6)$$

$$\text{Total \# calls in daily volume to be routed to service provider } C = (\text{Total \# calls in daily volume})*(\% \text{ calls to be routed to } C) = (1{,}000{,}000)*(10\%) = 100{,}000 \text{ calls to be routed to } C \quad (7)$$

$$\text{Service provider } C \text{ modulus operand} = (\text{Total \# calls in daily volume})/(\text{Total \# calls in daily volume to be routed to } C) = 1{,}000{,}000/100{,}000 = 10 \quad (8)$$

$$\text{Total \# calls in daily volume to be routed to service provider } D = (\text{Total \# calls in daily volume})*(\% \text{ calls to be routed to } D) = (1{,}000{,}000)*(5\%) = 50{,}000 \text{ calls to be routed to } D \quad (9)$$

$$\text{Service provider } D \text{ modulus operand} = (\text{Total \# calls in daily volume})/(\text{Total \# calls in daily volume to be routed to } D) = 1{,}000{,}000/50{,}000 = 20 \quad (10)$$

Since the majority of calls are to be routed to service provider A, a modulus operand is not computed for service provider A.

Upon computing the modulus operand for each of the service providers B, C, and D, a looping distribution algorithm is invoked to determine the service provider to which each incoming call is to be routed. If it is determined during a particular loop of the distribution algorithm that a call should not be routed to any of the service providers B, C, or D, the call is routed by default to the service provider A. The distribution algorithm determines which service provider to distribute each incoming call to as follows, where modSpB equals the computed service provider B modulus operand, modSpC equals the computed service provider C modulus operand, modSpD equals the computed service provider D modulus operand, and totObj equals the total number of calls in a daily call volume:

Step 1: callsRouted=number of calls routed=1;
Step 2: Loop until stop signal is received;
Step 3: For each call, perform modulus operation:
(c) modResSpB=service provider B modulus operation result=callsRouted % modSpB
(d) modResSpC=service provider C modulus operation result=callsRouted % modSpC
(e) modResSpD=service provider D modulus operation result=callsRouted % modSpD
Step 4: If modResSpB=0,
route call to service provider B and set callsRouted=callsRouted+1;
Step 5: If modResSpC=0,
route call to service provider C and set callsRouted=callsRouted+1;
Step 6: If modResSpD=0,
route call to service provider D and set callsRouted=callsRouted+1;
Step 7: If none of the modulus operations results in a value of zero,
route call to service provider A and set callsRouted=callsRouted+1;
Step 8: If callsRouted>totObj, set callsRouted=1;
Step 9: Repeat the loop.

As determined by the distribution algorithm, each incoming call is distributed (i.e., routed) to one of the service providers A, B, C or D based on predefined call routing volume percentages.

Figure 2:
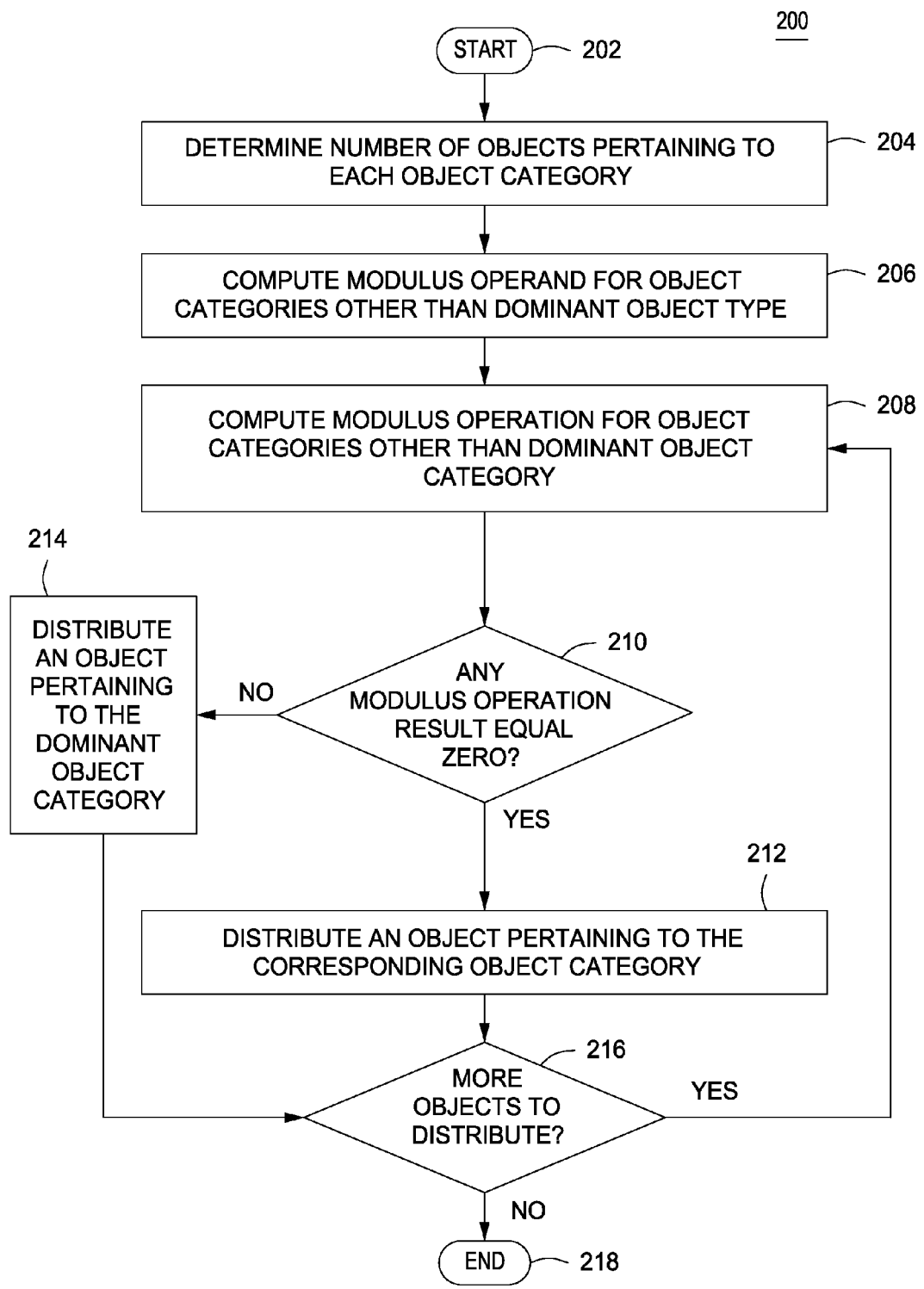
FIG. 2 is a flow diagram of a method for distributing objects in accordance with one or more embodiments of the present invention.

FIG. 2 is a flow diagram of a method 200 for distributing objects in accordance with one or more embodiments of the present invention. For a given total number of objects to be distributed, such as an estimated total or maximum number of objects to be distributed per distribution batch or period of time, the method 200 automatically determines the distribution of each object based on a mix (e.g., a predefined mix) of objects pertaining to different object categories. The objects may be data objects or physical objects and include, but are not limited to, file objects to be sent from a client to a server, phone calls to be routed to various destinations, or physical articles to be distributed to different physical locations. Examples of object categories include categories based on object type (e.g., data file formats, data file sizes, data file content, types of physical articles, size of physical articles, weight of physical articles, and the like) and categories based on distribution channels (e.g., different physical and/or logical channels for routing a data object, different locations to send a physical article, and the like.)

The method 200 starts at step 202 and proceeds to step 204. At step 204, the number of objects pertaining to each of the object categories other than the dominant object category (i.e., other than the object category having the highest percentage of objects within the total number of objects to be distributed) is determined. In some embodiments, the number of objects pertaining to a particular category may be computed as the total number of objects to be distributed multiplied by the percentage of objects for that category, for example as described above with respect to equations (1), (3), (5), (7), and (9).

The method 200 then proceeds to step 206 where a modulus operand is computed for each non-dominant object category (i.e., those object categories other than the dominant object category). For a particular object category, the modulus operand is computed as the total number of objects to be distributed divided by the number of objects pertaining to that category, for example as described above with respect to equations (2), (4), (6), (8), and (10). The method 200 proceeds to step 208. At step 208, a modulus operation is computed for each non-dominant object category. For a particular object category, the modulus operation is computed as (the number of objects that have been distributed plus one) modulo (the number of objects pertaining to that category), for example as described above in each of the distribution algorithms described with respect to FIG. 1 (i.e., in Step 3 of each of the described distribution algorithms).

The method 200 proceeds to step 210, where a determination is made whether any of the modulus operations computed in step 208 results in a value of zero. If the result of such determination is yes, that a modulus operation for a particular object category resulted in a value of zero, the method 200 proceeds to step 212. At step 212, an object pertaining to the corresponding object category (i.e., the object category for which the modulus operation results in a value of zero) is distributed. In some embodiments, an object is selected from a pool of objects pertaining to the corresponding object category and the selected object is distributed. For example, as previously described with respect to FIG. 1, an object category of Spanish language voice files may have a modulus operation result of zero, and a file is then selected from a pool of the Spanish language voice files and distributed to a transcription server. In some other embodiments, an object may be routed to a particular destination based on the corresponding object category. For example, as also previously described with respect to FIG. 1, an object category indicating distribution to a specific service provider may have a modulus operation result of zero and an incoming call is routed to that specific service provider. The method 200 proceeds from step 212 to step 216.

If, at step 210, the result of the determination is no, that none of the modulus operations computed at step 208 have resulted in a value of zero, the method 200 proceeds from step 210 to step 214. At step 214, an object pertaining to the dominant object category is distributed. In some embodiments, an object is selected from a pool of objects pertaining to the dominant object category and the selected object is distributed. For example, as previously described with respect to FIG. 1, an English language voice file may be selected from a pool of English language voice files and distributed to a transcription server. In some other embodiments, an object may be routed to a particular destination based on the corresponding object category. For example, also as previously described with respect to FIG. 1, a phone call may be routed to a particular service provider where that service provider is designated to receive the highest percentage of phone calls out of the total number of calls to be distributed. The method 200 proceeds from step 214 to step 216.

At step 216, a determination is made whether there are any additional objects to be distributed (i.e., whether distribution is complete for all of the total number of objects to be distributed). If the result of such determination is yes, that there are additional objects to be distributed, the method 200 returns to step 208. If the result of the determination at step 216 is no, that there are no additional objects to be distributed, the method 200 proceeds to step 218 where it ends.

Figure 3:
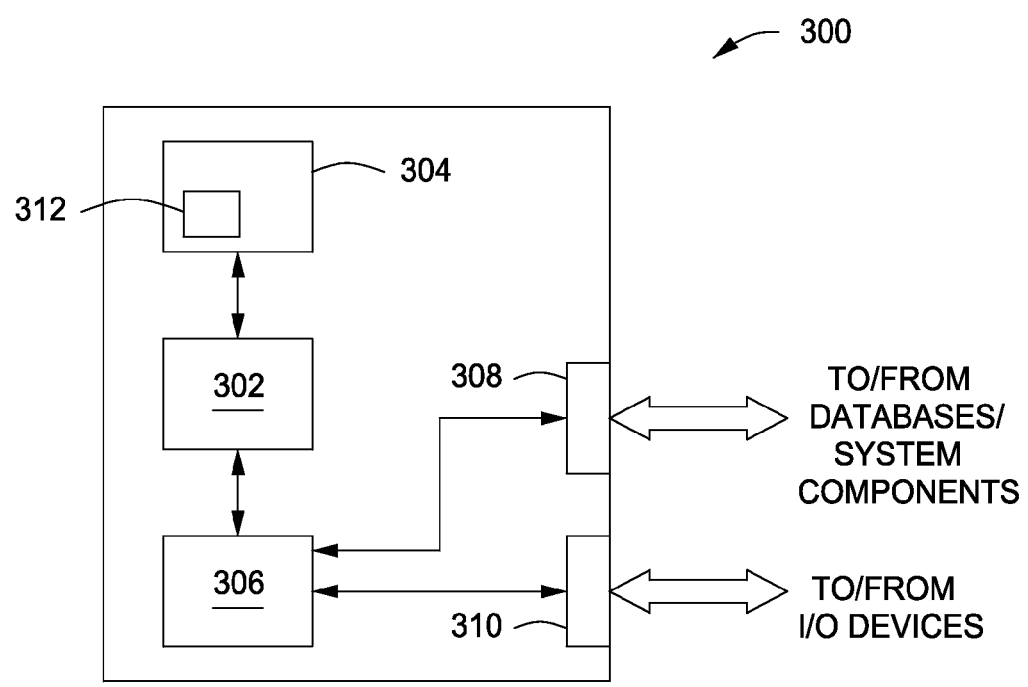
FIG. 3 depicts a schematic diagram of an apparatus (i.e., controller) that may be used to practice the method of the present invention.

FIG. 3 depicts a schematic diagram of an apparatus 300 (i.e., controller 300) that may be used to practice the method of the present invention. Any one, combination or all of the servers identified in the above Figures and/or discussed herein can function as a controller that may be used to practice the present invention. The details of such a device are depicted in FIG. 3 as controller 300. The controller 300 may be one of any form of a general purpose computer processor used in accessing an IP-based network such as a Local Area Network (LAN)/Wide Area Network (WAN), a corporate intranet, the Internet or the like. The controller 300 comprises a central processing unit (CPU) 302, a memory 304, and support circuits 306 for the CPU 302. The controller 300 also includes provisions 308/310 for connecting the controller 300 to databases, customer equipment and/or service provider agent equipment and one or more input/output devices (not shown) for accessing the controller 300 and/or performing ancillary or administrative functions related thereto. Note that the provisions 308/310 are shown as separate bus structures in FIG. 3; however, they may alternately be a single bus structure without degrading or otherwise changing the intended operability of the controller 300 or invention in general. Additionally, the controller 300 and its operating components and programming as described in detail below are shown as a single entity; however, the controller may also be one or more controllers and programming modules interspersed around a system each carrying out a specific or dedicated portion of the object distribution process. By way of non-limiting example, at least a portion of the controller 300 or software operations may occur at the call handling server 102 and/or the voicemail servicer 104 of FIG. 1. Other configurations of the controller and controller programming are known and understood by those skilled in the art.

The memory 304 is coupled to the CPU 302. The memory 304, or computer-readable medium, may be one or more readily available memory such as random access memory (RAM), read only memory (ROM), floppy disk, hard disk, flash memory or any other form of digital storage, local or remote. The support circuits 306 are coupled to the CPU 302 for supporting the processor in a conventional manner. These circuits include cache, power supplies, clock circuits, input/output circuitry and subsystems, and the like. A software routine 312, when executed by the CPU 302, causes the controller 300 to perform processes of the present invention and is generally stored in the memory 304. The software routine 312 may also be stored and/or executed by a second CPU (not shown) that is remotely located from the hardware being controlled by the CPU 302.

The software routine 312 is executed when a method of distributing objects is desired. The software routine 312, when executed by the CPU 302, transforms the general purpose computer into a specific purpose computer (controller) 300 that controls the interaction with one or more customer databases of, for example, FIG. 1. Although the process of the present invention is discussed as being implemented as a software routine, some of the method steps that are disclosed therein may be performed in hardware as well as by the software controller. As such, the invention may be implemented in software as executed upon a computer system, in hardware as an application specific integrated circuit or other type of hardware implementation, or a combination of software and hardware. The software routine 312 of the present invention is capable of being executed on computer operating systems including but not limited to Microsoft Windows 98, Microsoft Windows XP, Apple OS X and Linux. Similarly, the software routine 312 of the present invention is capable of being performed using CPU architectures including but not limited to Apple Power PC, Intel x86, Sun service provider agentRC and Intel ARM.

In some alternative embodiments, the present invention may be embodied as an application within a computing device such as a Personal Digital Assistant (PDA), a tablet, a portable media player, a mobile or smart phone, or the like. For example, a meter reader for a utility company may enter collected data on a smart phone or IPOD for processing by third-party vendors at negotiated account volumes. When entering the collected data on a smart phone, the data could be proportionally distributed to vendors in real time. When entering the collected data on an IPOD, the data could be distributed and written to vendor specific files for subsequent processing.

In other alternative embodiments, the present invention may be embodied as software on card validation terminals, such as credit card validation terminals used in retail stores. For example, a company that validates credit cards may have multiple facilities for validating the cards where the capacity for handling validations differs among the facilities. In accordance with an embodiment of the present invention, card validations may be distributed from the card validation terminals to the validation facilities based on the processing capacity of each facility. At each point of service, an estimate of the daily number of cards validated may be used along with the distribution ratios for each facility to obtain the modulo value for each facility, and the validation requests may then be routed accordingly.

In addition to the embodiments described above, the present invention may be utilized in distributing other types of physical and data objects, such as products assembled in a factory, collected data, text messages, and the like. Variations of the method, apparatus and system described above are possible without departing from the scope of the invention. In view of the wide variety of embodiments that can be applied, it should be understood that the illustrated embodiments are exemplary only, and should not be taken as limiting the scope of the following claims. For instance, the exemplary embodiments described herein, may be embodied as methods, apparatus, electronic devices, and/or computer program products. Accordingly, such embodiments may be embodied in hardware and/or in software (including firmware, resident software, micro-code, etc.), which may be generally referred to herein as a "circuit" or "module".

Other exemplary embodiments may take forms of computer program products disposed on a computer-usable or computer-readable storage medium having computer-usable or computer-readable program code or instructions (collectively "code") embodied in the medium for use by or in connection with an instruction execution system. As used herein, the computer-usable or computer-readable medium may be any medium that can contain, store, communicate, propagate, and/or transport the code for use by or in connection with the instruction execution system, apparatus, or device. This code may also be stored in a computer-usable or computer-readable memory that may direct a computer or other programmable data processing apparatus to function in a particular manner, such that the code stored thereon produces an article of manufacture including code that implements the functions specified in the previously described flowchart and/or block diagram block or blocks.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium include the following: hard disks, optical storage devices, magnetic storage devices, a portable computer diskette, a random access memory (RAM), a read-only memory (ROM), an erasable programmable read-only memory (EPROM or Flash memory), and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. A computer implemented method for distributing objects among a plurality of categories, comprising:
   computing a modulus operand for all but one of the plurality of categories based on a number of objects to be distributed and a number of objects pertaining to a first category of said plurality of categories;
   computing a modulus operation based on a number of distributed objects and the modulus operand; and
   distributing a first object pertaining to a first category or a second object pertaining to a second category based on a result of computing the modulus operation,
   wherein the first object is distributed if the result of computing the modulus operation is equal to zero and the second object is distributed if the result of computing the modulus operation is not equal to zero.

2. The method of claim 1, wherein the modulus operand is computed as the number of objects to be distributed divided by the number of objects pertaining to the first category.

3. The method of claim 1, wherein the modulus operation is computed as (the number of distributed objects plus one) modulo (the modulus operand).

4. The method of claim 1, wherein the number of objects to be distributed comprises a greater percentage of objects pertaining to the second category than objects pertaining to the first category.

5. The method of claim 1, wherein the first category is at least one of a data file type or a data distribution channel.

6. The method of claim 1, wherein the first and the second objects are data objects.

7. The method of claim 1, wherein the first and the second objects are physical objects.

8. A non-transitory computer readable medium storing a software program that, when executed by a computer, causes the computer to perform a method for distributing objects among a plurality of categories comprising the steps of:
   computing a modulus operand for all but one of the plurality of categories based on a number of objects to be distributed and a number of objects pertaining to a first category of said plurality of categories;
   computing a modulus operation based on a number of distributed objects and the modulus operand; and
   distributing a first object pertaining to a first category or a second object pertaining to a second category based on a result of computing the modulus operation,
   wherein the first object is distributed if the result of computing the modulus operation is equal to zero and the second object is distributed if the result of computing the modulus operation is not equal to zero.

9. The computer readable medium of claim 8, wherein the modulus operand is computed as the number of objects to be distributed divided by the number of objects pertaining to the first category.

10. The computer readable medium of claim 8, wherein the modulus operation is computed as (the number of distributed objects plus one) modulo (the modulus operand).

11. The computer readable medium of claim 8, wherein the number of objects to be distributed comprises a greater percentage of objects pertaining to the second category than objects pertaining to the first category.

12. The computer readable medium of claim 8, wherein the first category is at least one of a data file type or a data distribution channel.

13. The computer readable medium of claim 8, wherein the first and the second objects are data objects.

14. The computer readable medium of claim 8, wherein the first and the second objects are physical objects.

15. An apparatus for distributing objects among a plurality of categories, comprising:
  a processor for computing a modulus operand for all but one of the plurality of categories based on a number of objects to be distributed and a number of objects pertaining to a first category of said plurality of categories;
  a processor for computing a modulus operation based on a number of distributed objects and the modulus operand; and
  means for distributing a first object pertaining to a first category or a second object pertaining to a second category based on a result of computing the modulus operation,
  wherein the first object is distributed if the result of computing the modulus operation is equal to zero and the second object is distributed if the result of computing the modulus operation is not equal to zero.

16. The apparatus of claim 15, wherein the modulus operand is computed as the number of objects to be distributed divided by the number of objects pertaining to the first category.

17. The apparatus of claim 15, wherein the modulus operation is computed as (the number of distributed objects plus one) modulo (the modulus operand).

* * * * *